(12) United States Patent
Greisson et al.

(10) Patent No.: US 10,289,662 B2
(45) Date of Patent: May 14, 2019

(54) COMMUNICATION DEVICE AND METHOD FOR RECEIPT AND PRESENTATION OF INPUT AND FEEDBACK

(71) Applicant: BlackBerry Limited, Waterloo (CA)

(72) Inventors: Erik Artur Greisson, Malmö (SE); Per Erik Anders Jorisch, Malmö (SE)

(73) Assignee: BLACKBERRY LIMITED, Waterloo, Ontario (CA)

(*) Notice: Subject to any disclaimer, the term of this patent is extended or adjusted under 35 U.S.C. 154(b) by 1008 days.

(21) Appl. No.: 14/267,664

(22) Filed: May 1, 2014

(65) Prior Publication Data

US 2015/0317293 A1 Nov. 5, 2015

(51) Int. Cl.
*G06F 17/24* (2006.01)
*G06F 17/21* (2006.01)
*H04M 1/725* (2006.01)
*G06Q 10/10* (2012.01)
*H04L 12/58* (2006.01)

(52) U.S. Cl.
CPC .......... *G06F 17/24* (2013.01); *G06F 17/211* (2013.01); *G06Q 10/107* (2013.01); *H04L 51/04* (2013.01); *H04L 51/066* (2013.01); *H04M 1/72552* (2013.01); *H04L 51/18* (2013.01); *H04M 2250/70* (2013.01)

(58) Field of Classification Search
CPC .................................................. G06F 17/24
USPC ........................................................ 715/780
See application file for complete search history.

(56) References Cited

U.S. PATENT DOCUMENTS

| 2005/0099407 A1* | 5/2005 | Pennington ......... G06F 3/04883 345/179 |
| 2012/0017159 A1* | 1/2012 | Roh .................. G06F 17/30905 715/760 |
| 2012/0072856 A1 | 3/2012 | Park et al. |
| 2013/0097526 A1 | 4/2013 | Stovicek et al. |

FOREIGN PATENT DOCUMENTS

EP 2584770 4/2013

OTHER PUBLICATIONS

EPO, European Extended Search Report relating to Application No. 15164920.9, dated Sep. 21, 2015.
EPO, European Examination Report relating to European application No. 15164920.9, dated Jun. 13, 2017.

* cited by examiner

*Primary Examiner* — Tadesse Hailu
*Assistant Examiner* — Darrin Hope
(74) *Attorney, Agent, or Firm* — Rowand LLP (57) ABSTRACT

A device and method are provided for receiving and presenting input content. The device initially displays an input screen including a user action interface region having a first input field having a first fixed width and a fixed height. When overflowing content is detected, the first input field is replaced with at least one user interface element, and the first input field is translated and expanded to a new second position substantially non-overlapping with the first, the new input field being larger in width than the original input field.

20 Claims, 10 Drawing Sheets

COMMUNICATION DEVICE AND METHOD FOR RECEIPT AND PRESENTATION OF INPUT AND FEEDBACK

TECHNICAL FIELD

The present disclosure relates to the receipt and presentation of input and corresponding feedback at a mobile communication device.

TECHNICAL BACKGROUND

Portable mobile devices are frequently used for text- or symbol-based communication between endpoints using a variety of messaging protocols and formats. Input of message content by a user is typically accomplished by keystroke input, whether by means of a physical keyboard integrated in or connected to the mobile device, or, in the case where the mobile device's main user input is a touchscreen, by a touch-activated keypad or keyboard displayed on the touchscreen. Some mobile devices are also configured with speech recognition functions, and can process user speech input as message content input.

Mobile device user interface screens often display historical or contextual content, in addition to user controls. In the case of a messaging application, the historical or contextual content may include recent messages with a correspondent, which provide context for a new message that might be composed at the mobile device. The user controls can include a text input field or user interface elements for invoking various message-related actions. While a mobile device can be equipped to handle many messaging functions, the physical size limitations of mobile device displays impose constraints on the display of user controls or feedback concerning messaging functions.

BRIEF DESCRIPTION OF THE DRAWINGS

In drawings which illustrate by way of example only embodiments of the present disclosure, in which like reference numerals describe similar items throughout the various figures.

DETAILED DESCRIPTION OF THE INVENTION

In accordance with the embodiments and examples described herein, a method and communication device are provided for receiving input content from a user, and handling the input content together with historical or contextual data in a manner suitable for use with smaller screens. In particular, the method and communication device are configured to handle content input overflow conditions that arise during input of text or graphic content by a user.

Thus, in accordance with one example, there is provided a method for receiving and presenting input content on a device having a display, which may be a touchscreen display, the method comprising: initially displaying an input screen on the display, the input screen including a user action interface region comprising a first input field having a first fixed width and a fixed height; receiving content in the first input field; detecting an overflow condition for the first input field; and when the overflow condition is detected, replacing the first input field with either at least one user interface element invocable to initiate an action pertaining to the received content, or a feedback user interface element comprising information relating to the received content; displaying, in a region of the input screen adjacent to the user action interface region, a second input field having a second width greater than the first fixed width; and presenting the received content in the second input field.

In another example, there is provided a method for receiving and presenting input content on a device having a display, which may be a touchscreen display, the method comprising: displaying an input screen on the display, the input screen including a first input field for receiving user-input content, the first input field having a first fixed width and a fixed height and occupying a first region of the input screen; receiving user-input content in the first input field; detecting an overflow condition for the first input field; and when the overflow condition is detected, executing a translation and expansion of the first input field to provide a second input field displayed in the input screen in place of the first input field, the second input field occupying a second region of the touchscreen that does not overlap with the first region, the second input field having a second fixed width greater than the first fixed width of the first input field, and presenting the received user-input content in the second input field.

In one aspect, the method can also include receiving additional content in the second input field; and when a further overflow condition is detected for the second input field, expanding an area of the second input field and continuing to receive additional content.

In another aspect, the initially displayed input screen includes a history region positioned adjacent the user action interface region, and displaying the second input field comprises inserting the second input field between the history region and the user action interface region.

In still a further aspect, the user action interface region has a defined width, and the second width of the second input field is substantially equal to the defined width of the user action interface region.

In yet another aspect, content is received in the first input field and the second input field by an indirect user input method, and the at least one user interface element is invocable by a direct user input method. The indirect user input method may be either text input using a virtual keyboard or physical keyboard, or text input using speech to text recognition; and the direct user input method may be a touch on the at least one user interface element.

In some examples, the feedback user interface element comprises a character count display element.

In other examples, the initially displayed user action interface region further comprises at least one initial user interface element invocable to initiate an action pertaining to the received content, the at least one initial user interface element being invocable by a direct user input method.

In some examples, the input screen is a messaging input screen, such as for instant messaging, SMS, or email; in other examples, the input screen is for use with a social networking application or a web browser.

There is also provided a communication device, such as the mobile device described below, optionally employing a touchscreen, that is configured to execute the methods and examples described herein. The device may be configured with various modules and components, described below, that are implementable in hardware and/or software, and in the case of software components, capable of being executed by at least one processor of the device. There is further provided computer-readable media, namely non-transitory or physical media, that store code that when executed by a processor of a suitable device, causes the device to implement the methods and examples described herein.

The examples set out herein will be described and illustrated primarily in relation to mobile devices (also referred to below as electronic devices), such as tablet computers, smartphones, or any other portable electronic communication device, which may or may not be equipped to communicate over wireless networks or public networks. It will be appreciated by those skilled in the art, however, that this description is not intended to limit the scope of the described embodiments to implementation on these particular systems. For example, the methods and systems described herein may be applied to any appropriate communication device or data processing device adapted for composition and transmission of messages whether or not the device is portable or wirelessly enabled. Additionally or alternatively the device may be adapted to process data and carry out operations on data in response to user commands for any number of purposes, including productivity and entertainment. Thus, the examples described herein are not intended to be limiting.

Figure 1:
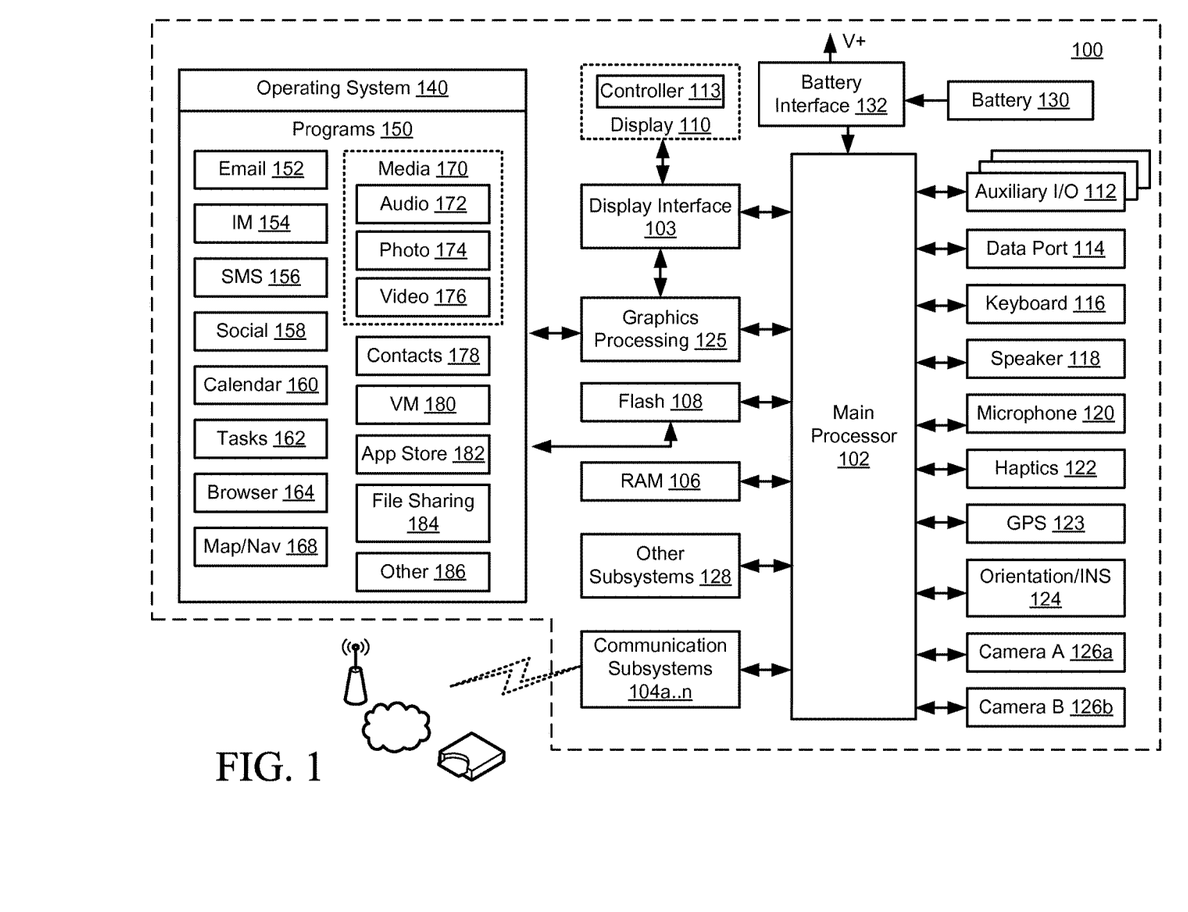
FIG. 1 is a block diagram of an example of a communication device.

FIG. 1 is a block diagram of an example of an electronic device 100 that may be used as the mobile device in the examples described herein. The electronic device 100 includes a number of components such as a main processor 102 that controls the overall operation of the electronic device 100. It will be understood by those skilled in the art that the schematic of FIG. 1 is merely representative of only particular aspects of a device, and omits other components that are typically included for ease of exposition. Furthermore, it should also be understood that many of the components described in FIG. 1 are optional and that an electronic device can be successfully used with the various embodiments described herein even when select components described in relation to FIG. 1 are omitted.

The electronic device 100 may be a battery-powered device including a battery interface 132 for receiving one or more rechargeable batteries 130 and/or an adaptor for receiving and converting mains power for powering the device, and/or charging a rechargeable battery. Communication functions, including data and optionally voice communications, are performed through one or more communication subsystems 104a-104n in communication with the processor 102. Other functional components used to accomplish these functions, such as antennae, decoders, and the like, may be considered to be part of these subsystems. Communication subsystem 104 is used to exchange data with a wireless network in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless links connecting the communication subsystems 104a-n represent one or more different Radio Frequency (RF) channels, operating according to defined protocols specified for the wireless communications standard, and optionally other network communications such as wireless LAN (e.g., one or more of the 802.11™ family of standards), near-field communication, Bluetooth® and the like. Communication subsystems 104a-104n may include a receiver, transmitter, and associated components such as one or more antenna elements, oscillators, or digital signal processors. The particular design of a communication subsystem is dependent on the communication network with which it is intended to operate.

The main processor 102 also interacts with additional subsystems, if present, such as a Random Access Memory (RAM) 106, a flash memory 108, other data and memory access interfaces such as an auxiliary input/output (I/O) subsystem 112 or a data port 114, a physical keyboard 116, a speaker 118, a microphone 120, a haptics module 122, one or more cameras 126a, 126b, and other device subsystems 128. Other I/O subsystems can include input pointing device or touch devices such as a trackball, infrared fingerprint detector, roller wheel, optical joystick, or trackpad. The electronic device may also be provided with an orientation or inertial navigation sensor 124 such as an accelerometer, used to detect the orientation of the display 110.

The electronic device 100 is provided with a display 110 controlled by a display controller 113 that is either integrated with or external to the chassis containing the main processor 102. Graphics data processed by the main processor 102, or optionally by a separate graphics processor 125, is outputted to the display 110 via a display interface 103. In the case of a portable (such as a handheld) electronic device 100, the display 110 is typically integrated with the device 100.

In some embodiments, the electronic device 100 may be a touchscreen-based device, in which the display interface 110 is a touchscreen interface that provides both a display for communicating information and presenting graphical user interfaces, as well as an input subsystem for detecting user input that may be converted to instructions for execution by the device 100. The touchscreen display interface 110 may be the principal user interface provided on the electronic device 100, although in some embodiments, additional input mechanisms are provided. If a touchscreen display interface 110 is provided, then other user input means such as the keyboard 116 may or may not be present. Optionally, an external keyboard may be connected to the device 100 via a data port or transmitter, such as a USB port, Bluetooth® transceiver, and the like.

The construction and operation of a suitable touchscreen for use in a mobile device will be understood by those skilled in the art. When a touch is detected by a touchscreen display 110, the location is determined by either a processor associated with the device (e.g., the display controller 113 or the main processor 102) and interpreted as touch or gesture events for handing by the operating system or another process executing on the device. A touchscreen device is particularly presented in the various examples described herein; however, it will be understood by those skilled in the art that these examples can also be implemented with devices that do not have touchscreens, with suitable modification within the scope of the skilled worker's abilities. For instance, in some examples, a touch or gesture is applied to the display of the device to initiate an action; this can be accomplished using other input means as well.

The electronic device 100 also includes an operating system 140 and software components 152 to 186, collectively indicated as programs 150 in FIG. 1. The operating system 140 and programs 150 that are executed by the main processor 102 are typically stored in a persistent store such as the flash memory 108, which can alternatively be a read-only memory (ROM) or similar storage element (not shown). Portions of the operating system 140 and the programs 150 such as specific device applications or parts thereof can be temporarily loaded into a volatile store such as the RAM 106. Other software components 186 besides those explicitly illustrated in FIG. 1 can also be included, as is well known to those skilled in the art. The operating system 140 and programs 150 or portions thereof may be installed on the device 100 during manufacture or initial programming, or may be loaded via any suitable means such as the data port 114 or a communication subsystem 104a-104n.

The electronic device 100 may be configured for communication using a variety of network protocols and messaging protocols and formats. Thus, programs 150 can include messaging and social networking applications such as one or more email messaging applications 152; instant messaging applications 154; short message service (SMS) messaging applications 156; social networking applications 158. These applications represent general categories or types of electronic messaging implementable on mobile communication devices such as electronic device 100 and are not intended to be limiting. Sent and received messages may be stored in non-volatile memory on the device 100. Multiple applications may be installed for use with the same message formats and protocols; for instance, there may be several instant messaging applications 154 installed on the device 100, each for use with a different service provider or network. There may also be included a unified inbox application, not shown in FIG. 1, which integrates messages (incoming and/or outgoing) retrieved from multiple data stores associated with different messaging and social networking applications. The unified inbox application may be used to invoke entry points into the individual, dedicated messaging applications 150-158 to permit the user to read and/or compose and send messages, or the unified inbox application may include its own user interfaces that display the messages associated with different protocols or formats, and permit the user to compose and send messages associated with one or more of the protocols and formats. In use, a received signal such as a message, file download, or streaming content will be processed by the receiving communication subsystem 104a-104n and input to the main processor 102. The main processor 102 will then process the received signal for storage in a data store, output to the display 110, and/or output to another subsystem such as speaker 118.

Other applications that may be included on the electronic device 100 are calendar applications 160; tasks or reminder applications 162; browsers 164; map or navigation applications 168; media players 170, which may include distinct audio/music players 172, photo viewers 174, and video players 176; address book or contact applications 178; virtual machines 180 for executing applications requiring a runtime environment other than that provided by the operating system 140; retail applications 182 for purchasing applications, music, books, and other digital goods for use on the electronic device 100; file sharing applications 184; and other applications 186.

Currently, electronic messaging and or "sharing" using features such as the aforementioned instant messaging, SMS, email, and social networking applications are popular uses for mobile devices. These functions frequently involve the input of textual and graphical content by the user for transmission to one or more recipients or services. Some messaging or social networking services impose hard limits on the size of a message or posting to a fixed number of characters. For instance, the Twitter® social networking platform restricts text input to 140 characters. Other forms of messaging or social networking, however, offer more flexibility in terms of message length, permitting the user to compose relatively lengthy messages. In some cases, when a messaging format imposes a strict limit on the size of a message, a lengthy composed message may be broken down into multiple packets or messages to fit without the parameters of the messaging format; this activity, however, is transparent to the user.

Even though messages of any length may theoretically be composed, the physical limitations of a mobile messaging platform may impose practical constraints on users and mobile devices. The limited screen space of some mobile devices—particularly smartphones and smaller-size tablet computers—restricts the amount of screen space that can be allocated to various functions or features of a messaging or social networking application.

Figure 2A:
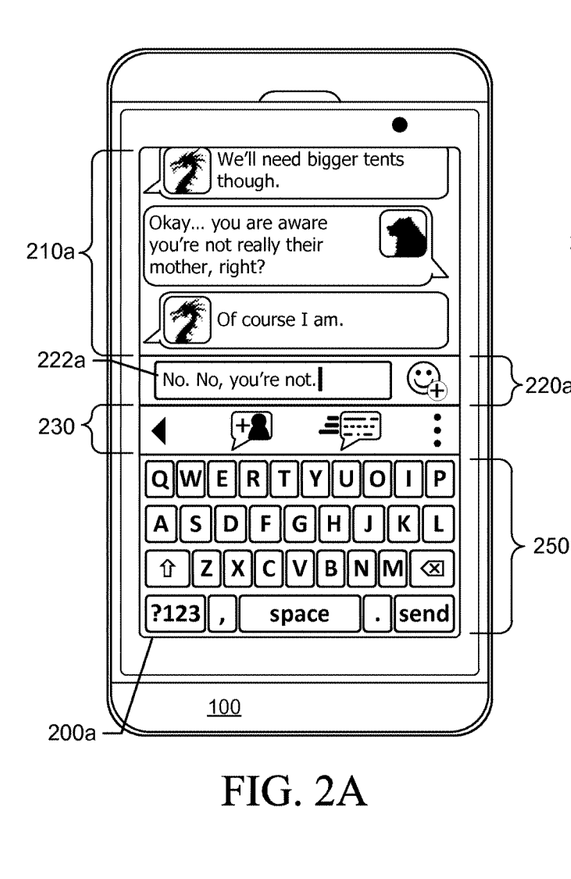
FIGS. 2A to 2C are diagrams illustrating example user interface screens for use with an instant messaging or SMS messaging application.
Figure 2B:
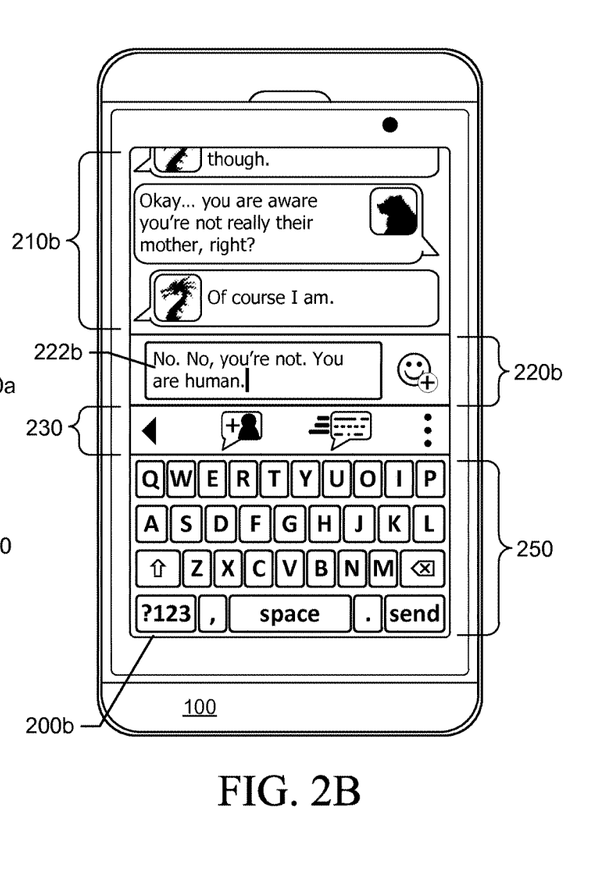
Figure 2C:
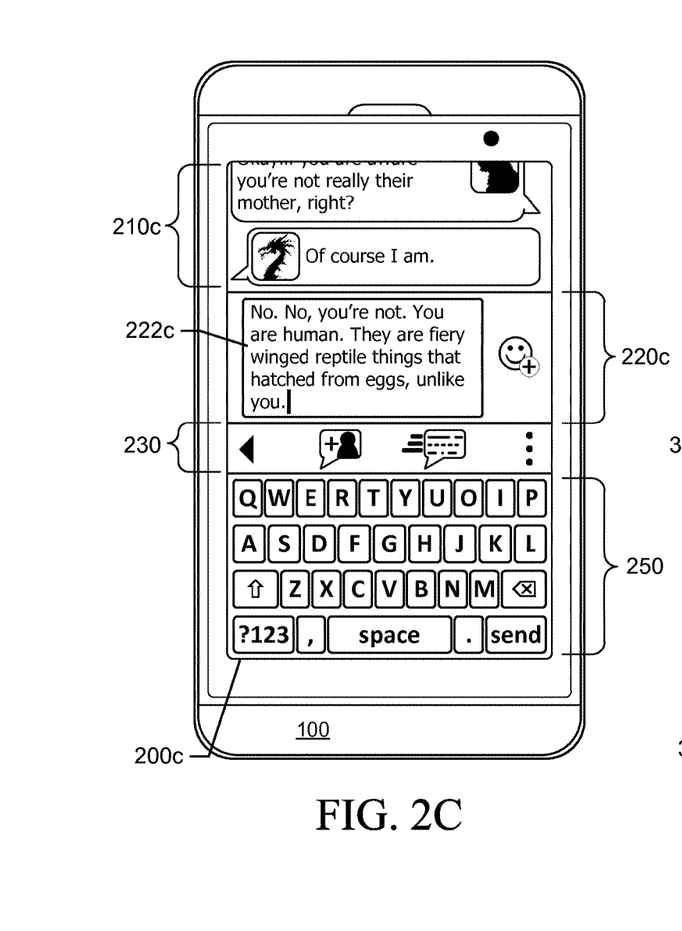

FIGS. 2A to 2C illustrate a possible arrangement of a user interface screen 200a, 200b, 200c responsive to overflow conditions on a mobile device. In FIG. 2A, an initial screen 200a displayed on a touchscreen-based device 100 is shown, including a history or retrieved content region 210a, a text input bar 220a, a user control bar 230, and a virtual keyboard 250. The virtual keyboard 250 is included in this example as a text input mechanism. The keyboard 250 may optionally be dismissed or hidden from view. Text is input by the user manipulating the virtual keyboard 250 by touch; the detected touches over various keys or buttons of the virtual keyboard are processed by the processor 102 and converted to instructions to echo corresponding text in the text input bar 220a. Similarly, if text is input by user manipulation of a physical keyboard 116 (not shown in FIGS. 2A to 2C), keystrokes on the keyboard by the user initiate signals to the processor 102 to echo corresponding text in the text input bar 220a. As those skilled in the art will appreciate, text may be input using different mechanisms, including an audible input mechanism which can include a microphone 120 operating in conjunction with a speech-to-text module. As the audible input mechanism detects speech and converts it to text, the text is presented in the text input bar 220a.

In this manner, the input via the keyboard 250 or 116, or by the audible input mechanism, may be considered to be forms of "indirect" user input inasmuch as the text content that is presented in the text input bar 220a is not input by direct interaction by the user with the text input bar 220a. In other words, the user does not engage in touch events (via the touchscreen) or pointer events (via a pointing device, such as a mouse or trackball) to enter newly composed text into the text input bar 220a. Instead, the text is input using a further user interface mechanism, such as a keyboard (whether displayed on the touchscreen or physical) or microphone. This does not preclude some forms of direct user input into the text input bar 220a. For instance, in some examples, touch events or pointer events on the text input bar 220*a* may be used to select and edit content that is already input, or to paste in content that was copied from another source.

In FIG. 2A, the history or retrieved content region 210*a* extends over a substantial part of the display and user interface screen 200*a* that is not currently occupied by the virtual keyboard 250. In this example, the user interface screens 200*a*-200*c* represent an instant messaging application, so the history region 210*a* here comprises recently sent and received instant messages associated with the application. These messages may have been retrieved from a data store at the mobile device 100. The user control bar 230 contains various user interface elements that may be used to invoke actions associated with the messaging application, such as selecting recipients, sending a newly-composed message, and the like. The text input bar 220*a* here includes a text input field having a first size 222*a*. In FIG. 2A, the field 222*a* includes a first amount of text.

FIG. 2B illustrates an effect on the user interface screen 200*a* when an overflow condition is detected. The overflow condition is a state where content input for a given field exceeds the displayable space of that field. The overflow condition may be generally assessed by character count, pixel size, point size, or any other suitable metric. For instance, if the size of the field 222*a* is measured in pixels or another unit length measurement, an overflow condition is detected when the processor 102 determines that a displayable length of received input exceeds the maximum available length available for displaying the input in the field 222*a*. The maximum available length may represent the total width of the field 222*a*, less any margin allowed within the field 222*a*, increased by a multiplier. In the case of FIG. 2A, the text input field 222*a* has a first height that permits only one line of content to be displayed at a time. "Height", as used herein, refers to a dimension in the typical direction of reading associated with increasing or decreasing paragraph or line order (in the case of English, for instance, a vertical direction). "Width", as used herein, refers to a dimension in the typical direction of reading a line of text (in the case of English, a horizontal direction). The number of lines permitted in a field is a multiplier applied in computing the maximum available length. The displayable length of the received input may be computed in pixels or the same units as the maximum available length. This length may be determined from known widths of text character content input in the field 222*a*. In addition, where input can include graphical content (e.g., emojis or other iconic graphics), the displayable length of the received input includes the length of the graphical content, plus an additional margin space allotted for graphical content.

When the overflow condition is detected, in response the device 100 updates the display of the user interface screen 200*a* to the example 200*b* of FIG. 2B. In this example, the keyboard 250 remains the same (although as noted above, it may be dismissed or hidden); the user control bar 230 also remains the same; but the text input bar 220*b*, text input field 222*b*, and the history region 210*b* have changed in proportions. Now, the text input bar 220*b* is larger in height, occupying greater vertical space in the user interface screen 200*b*. The text input field 222*b* is also increased in height, and now accommodates two lines of text, thereby increasing its maximum available length for displaying content. Because the text input bar 220*b* is now higher, the size of the history region 210*b* has decreased to accommodate this change.

FIG. 2C illustrates the result as text continues to be entered in the text input field 222*b*. When the maximum available length for the expanded text input field 222*b* is detected, an overflow condition is detected again, and in response the processor 102 increases the size of the text input field as indicated by 222*c* in user interface screen 200*c*. This particular example field 222*c* now has four lines of text. The height of the text input bar 220*c* has also increased, and the size of the history region 210*c* has further decreased to compensate.

From the foregoing examples, it can be seen that there is a shifting balance between the available space for displaying contextual or historical content (i.e., the content of the history regions 210*a*-210*c*) and newly-entered content such as the text input in fields 222*a*-222*c*. As more text is input in a text input field and an overflow condition is detected, the size of the text input field expands to accommodate the content. As can be seen in FIGS. 2A to 2C, the expansion retains the original position of the text input field 222*a* and 222*b*, expanding only at the top of the field. The width of the field remains constant throughout. As the height increases, the number of available lines for displaying content expands. The maximum length available to display content therefore increases. However, the size of the history region decreases at substantially the same rate as the text input bar 220*a* and text input field 222*a* increases.

The loss of displayed history in the foregoing example due to the reduction in the size of the history region 210*a* results in a loss of useful informational context for the user employing the instant messaging application to compose a new message. As the user continues to input content, the text input fields 222*a* increases in size and the number of messages visible in the history region 210*a* decreases as they are "pushed" off the screen. Should the user find that she needs to consult an older message in the history (that might have originally been displayed onscreen in the first user interface screen 200*a*), the user may need to abort input, or at least delay inputting text and invoke other user interface mechanisms to re-display the older content in the conversation. This pause necessitates an increase in resources consumed by the mobile device 100, as it now takes longer for a complete message to be composed and sent. The increased time taken to engage in these steps also delays any real-time aspect of the messaging conversation between the user and her correspondent. It is further possible that the reduction of the size of the history region 210*a* may induce some users to refrain from composing longer messages, and instead compose numerous short, one-line messages in order to avoid the inconvenient loss of context. This can impose a greater burden on a messaging infrastructure (e.g., the wireless network) as an increased number of short messages must now be transmitted, instead of a lower number of larger messages.

It may be appreciated by those skilled in the art that an overflow condition may also be handled by maintaining the text input field 222*a*-222*c* (and the maximum length of displayable content) at a constant size, and merely scrolling content in the text input field as further content is input. However, this limits visibility of the input content on the screen, increasing the likelihood of error in message composition by a user (since earlier content in the composed message is hidden), and increasing the likelihood that the user will instead send shorter, single-line messages as to avoid the inconvenience of scrolling text.

Figure 3A:
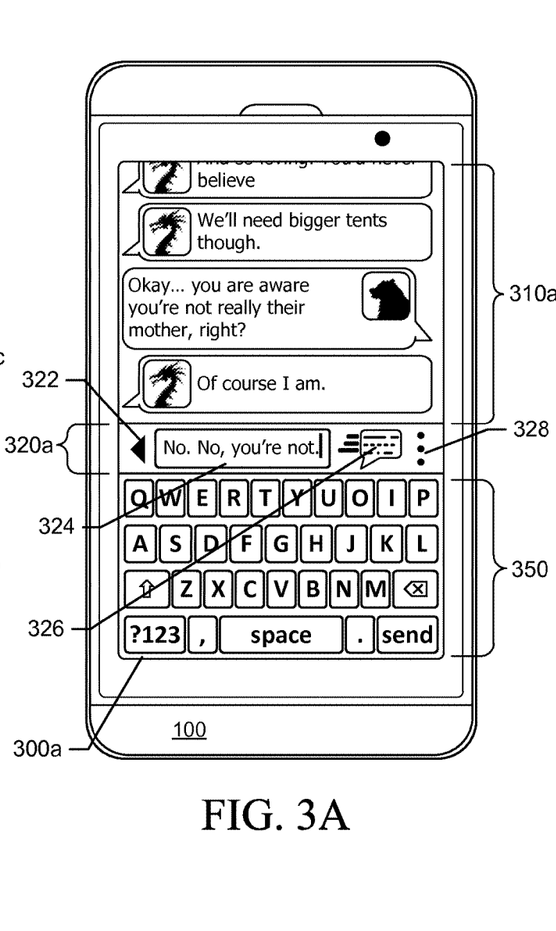
FIGS. 3A to 3E are diagrams illustrating further example user interface screens for use in handling overflow conditions in an instant messaging or SMS messaging application in accordance with an embodiment described herein.

Accordingly, the mobile device 100 can be configured to balance the relative display areas available to both context and new content input. Turning to FIG. 3A, an initial input screen 300a is shown. This input screen 300a again includes a history or context region 310a, a virtual keyboard 350 (optional, as described above), and a single user action interface region 320a. This single user action interface region 320a includes, in this case, a number of user interface elements such as a back/return button 322 (to permit the user to return to a home screen, unified inbox screen, or previous activity on the mobile device 100); a send button 326; and a "more" button 328, providing access to further functions, as would be understood by those skilled in the art. In the example of FIGS. 3A to 3E, the mobile device 100 is again touchscreen-based, so these buttons may be actuated by a user touch directly on these elements on the touchscreen display 110 (in other words, a "direct" user input). The user action interface region includes an input field 324, adapted to receive content input. The input field 324 has fixed width and height. Content input may be textual, as generally described above; it can also include graphical content such as icons, emoji, and the like. The input field 324, like the text input field 222a above, receives indirect user input.

Figure 3B:
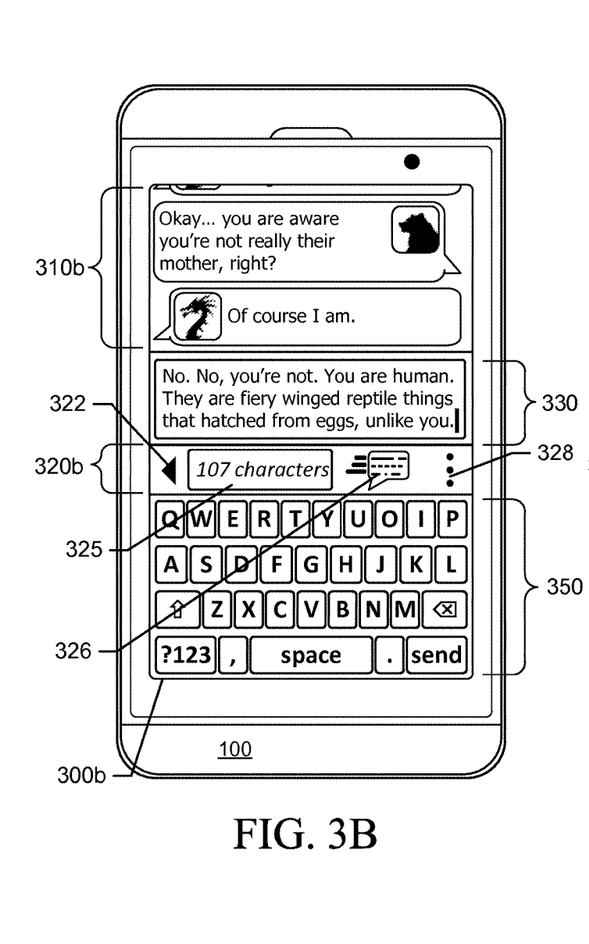

In FIG. 3A, some text has been input in the input field 324. FIG. 3B illustrates an instance where an overflow condition, as described above, has been detected for the input field 324, with text content input beyond the maximum displayable length available in the input field 324. In response to the overflow condition, as can be seen in the subsequent input screen 300b, the user action interface region 320b has been modified to remove the input field 324; in its place, a further user interface element, here a feedback user interface element 325, has been inserted in its place. The input field 324 has been translated (moved) and expanded to a new position and size, as indicated by new input field 330. In this example, the new position does not overlap with the position of the previous input field 324. This new field 330 now extends substantially across the available width of the input screen 300b and is greater than the fixed width of the previous input field 324. The input content is then displayed in the new field 330. The maximum displayable length for content in the new input field 330 is thus greater than the previous input field 324. In this particular example, the new input field 330 accommodates multiple rows of content. Comparing the text input content of the new field 330 with the content of 220c in FIG. 2C, it can be seen that the same text now occupies less height in the input screen 300b. Since the history region 310b has been reduced in size as a result of the introduction of the new input field 330, some context is no longer viewable on the screen; however, because the new input field 330 occupies less height, more context in history region 310b is still viewable than in the region 210c of FIG. 2C.

In the example of FIG. 3B, the space previously occupied by the input field 324 has been replaced by a feedback user interface element 325 that displays a current character count for a message. This element is not interactable; the user cannot directly or indirectly input content or interact with the element. Thus, where there was previously a combined multimodal-input user action interface region 320a, which permitted both direct and indirect user input, there is now an altered user action interface region that receives only direct user input, and a separate region 330 that receives indirect user input.

Figure 3C:
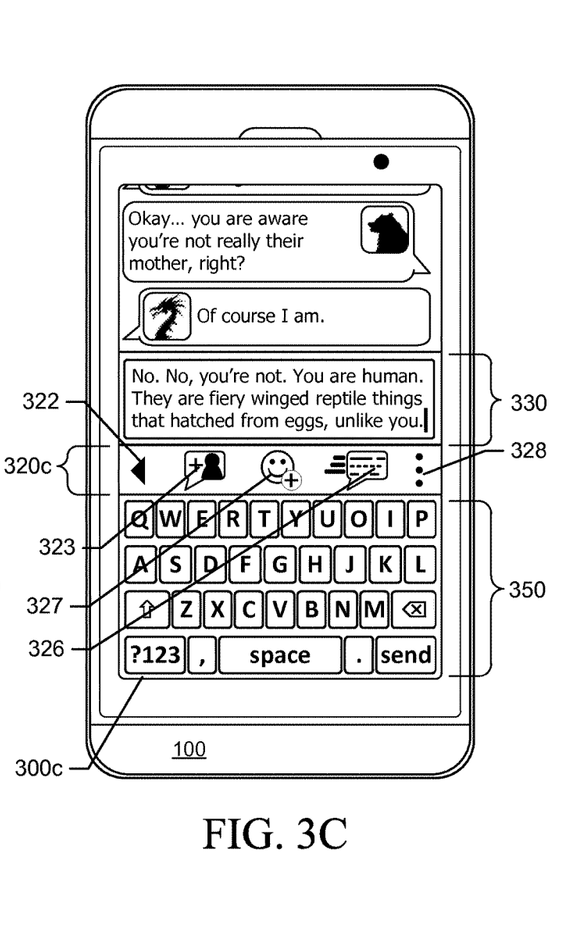

FIG. 3C illustrates a possible alternative user action interface region 320c to the region 320b of FIG. 3C. In the screen 300c of FIG. 3C, the user action interface region 320c now includes further user interface elements 323 and 327. These particular elements, like the send button 326, represent actions that can be initiated with respect to content in the input field 330. For instance, the first additional user interface element 323 may be used to add a new recipient for a message comprising the content in the input field; the second additional user interface element 327 can be actuated to display a menu of emoji or icons for selection and insertion into the input field.

Figure 3D:
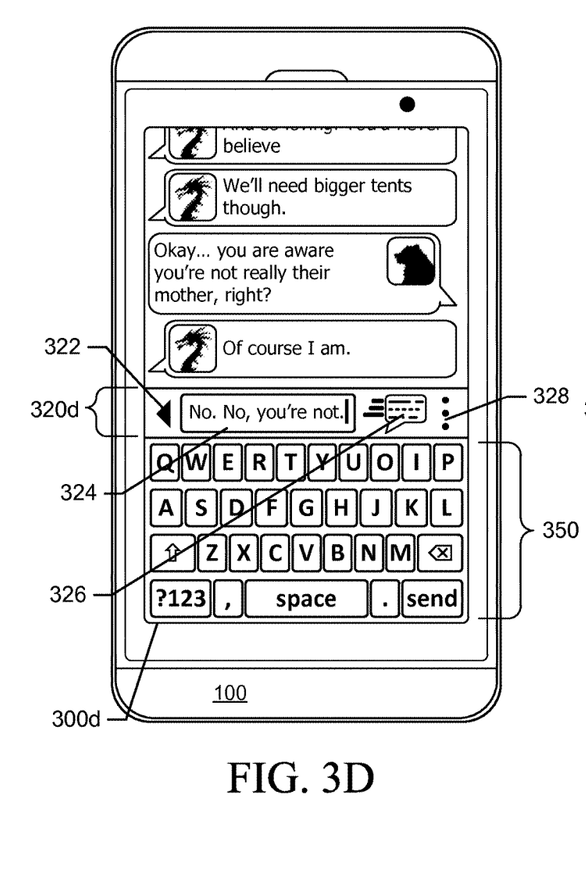
Figure 3E:
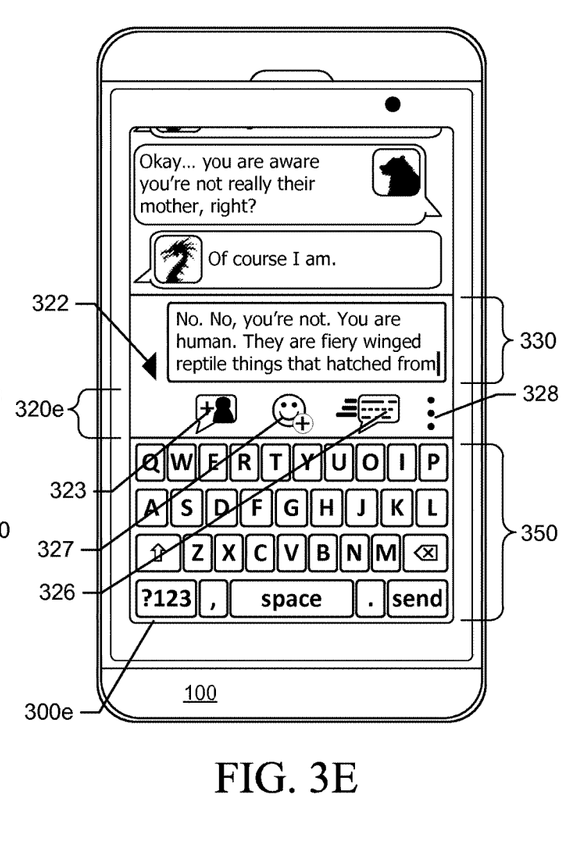

FIGS. 3D and 3E illustrate initial and subsequent input screens 300d, 300e in a further example. In FIG. 3D, the initial input field 324 is displayed in an initial user action interface region 320d, which here includes a back button 322. In response to the detection of an overflow condition, as can be seen in screen 300e the back button 322 is shifted, as well as the position of the input field, which is now presented as input field 330. The input field 330 is still positioned adjacent to, but not overlapping, the user action interface region (now indicated as 320e).

Figure 4:
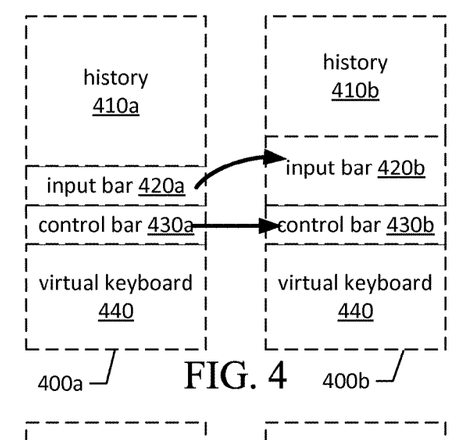
FIGS. 4 to 7 are schematics of user interface region transitions when handling overflow conditions.

The foregoing examples illustrate a transition in a user interface display in response to a detected overflow condition to accommodate both contextual information and newly input content. FIGS. 4-7 summarize some example transitions in schematic form. FIG. 4 illustrates the general transition from screen 400a to 400b that was depicted in FIGS. 2A-2C. In screen 400a, the history 410a, input bar 420a, user control bar 430a, and virtual keyboard 440 appeal in a first proportion. In response to the detected overflow, the virtual keyboard 440 and action bar 430a remain static and fixed in size, as indicated by virtual keyboard 440 and action bar 430b in screen 400b; however, the input bar 420b is increased in size, and the history region 410b decreased in size.

Figure 5:
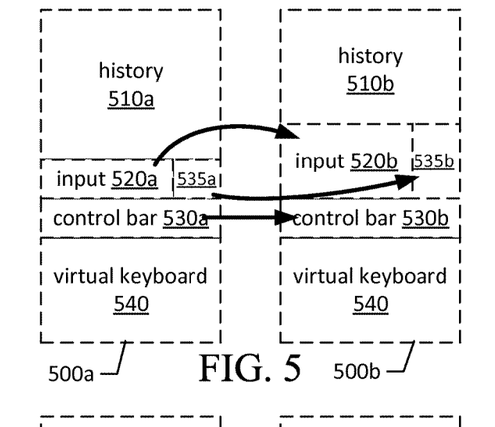

FIG. 5 illustrates a variant of FIG. 4 in which a first screen 500a includes a history region 510a, user control region 530a, input region 520a with an adjacent supplemental control region 535a including other user controls, and virtual keyboard 540. In response to a detected overflow condition, the screen transitions to 500b, in which the control bar 530b remains the same size, as does the history 510b and keyboard 540, but the input region 520b and the supplemental control region 535b increase in height, with a consequential decrease in history region 510b.

Figure 6:
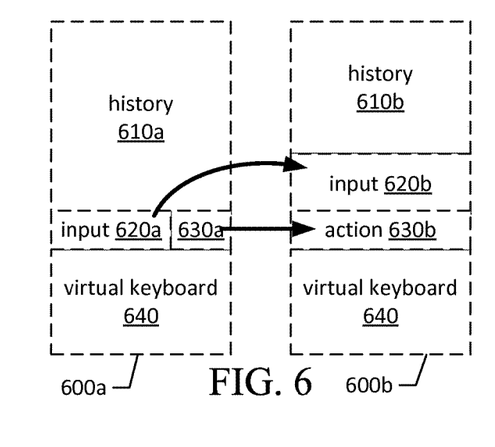
Figure 7:
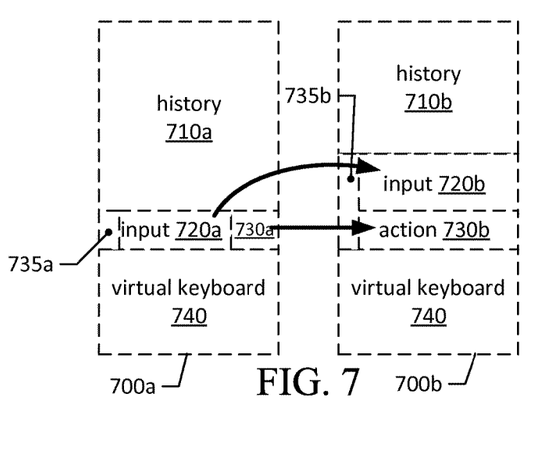

FIGS. 6 and 7 illustrate schematic examples similar to the user interface screens of FIGS. 3A to 3E. In FIG. 6, initial screen 600a, includes a history region 610a, an input field region 620a and user interface portion 630a which, together, represent a user action interface region; and a virtual keyboard 640. In response to a detected overflow condition, the input field region 620a is translated and expanded and re-presented as input field region 620b in screen 600b; and the user interface portion 630a now effectively extends to fill an entire region 630b. Similarly, in FIG. 7, in a first screen 700a, the input field region 720a and user interface portion 730a are altered in response to a detected overflow condition in the input field region 720a, and transition to new input field region 720b and region 730b, respectively. The new input field regions 620b, 720b, are larger in width than the original regions 620a, 620b, and are located in regions adjacent to the location of the previous input field region.

Figure 8A:
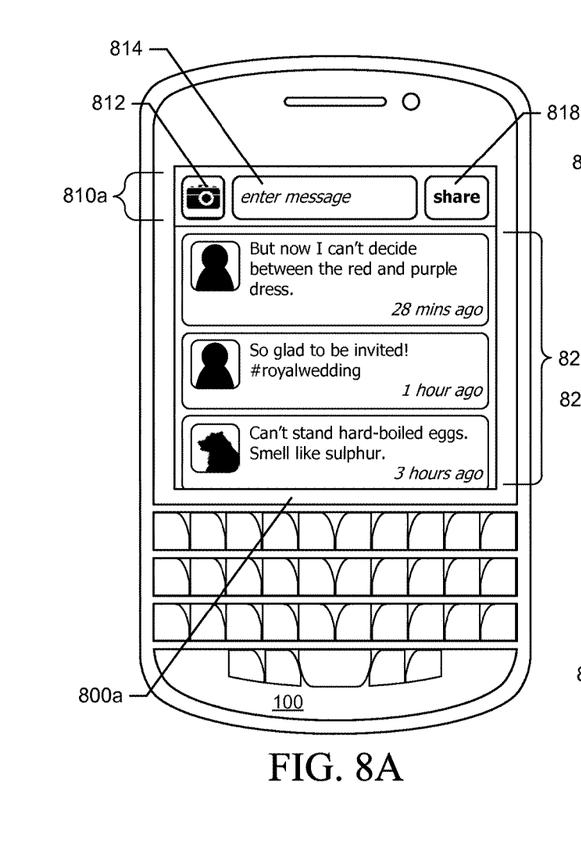
FIGS. 8A and 8B are diagrams illustrating example user interface screens for use with a social networking or similar application.
Figure 8B:
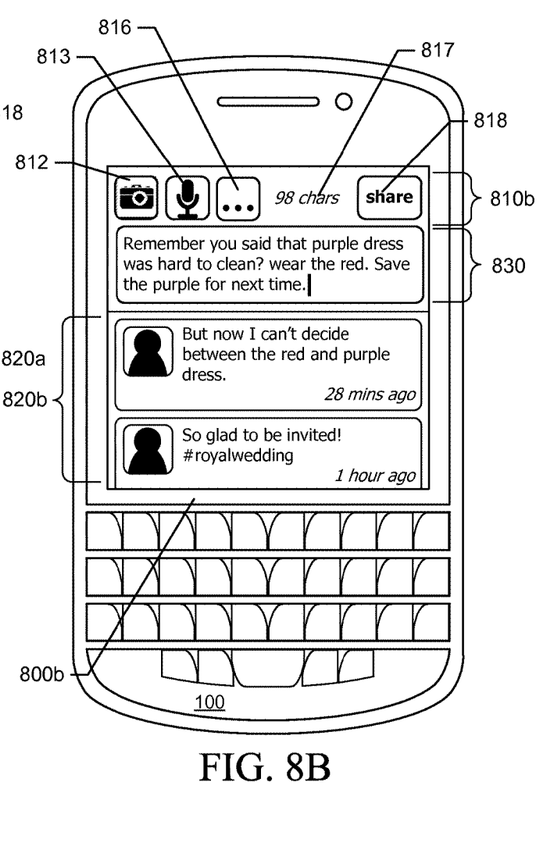

In the foregoing examples, instant messaging was illustrated due to its current prevalence; however, it will be appreciated by those skilled in the art that these embodiments need not be restricted to this particular type of text-based electronic communication data structures, but can be applied, with suitable modifications, to other communication formats. FIG. 8 in particular illustrates an example implementation in connection with social networking platform. FIG. 8A illustrates a first screen 800a which again includes a user action interface region 810a, which permits multimodal input (e.g., indirect text input in an input field 814, and direct input to activate a camera function on the device using user interface element 812, or to post the input content to destination recipients or servers using user interface element 818), as well as a history or retrieved content region 820a. In this example, the history region 820a is used to display recent posts or messages from social networking contacts. As with the instant messaging examples of FIGS. 3A to 3E, the input field 814 has a fixed width and height.

FIG. 8B illustrates the result of detected overflow input in the input field 814 of FIG. 8A. In screen 800b of FIG. 8B, the user action interface region 810b has been modified from the initial screen to remove the input field 814, and in its place a number of user interface elements 813, 816, and 817 have been included. These user interface elements include actuatable elements that can be touched or clicked to invoke a further action (e.g., record audio, show more options) and non-actuatable elements that are not interactive but display a character count for input content. The input field 814 has been translated and expanded to input field 830 so that it now has a greater width than the previous field 814. The benefit of this transition is similar to that shown in FIG. 3B, namely that while the history portion 820b of the screen 800b is decreased in size compared to 820a, the rate at which it must be decreased in response to continued overflow is reduced compared to the rate illustrated in FIGS. 2A to 2C.

Figure 9A:
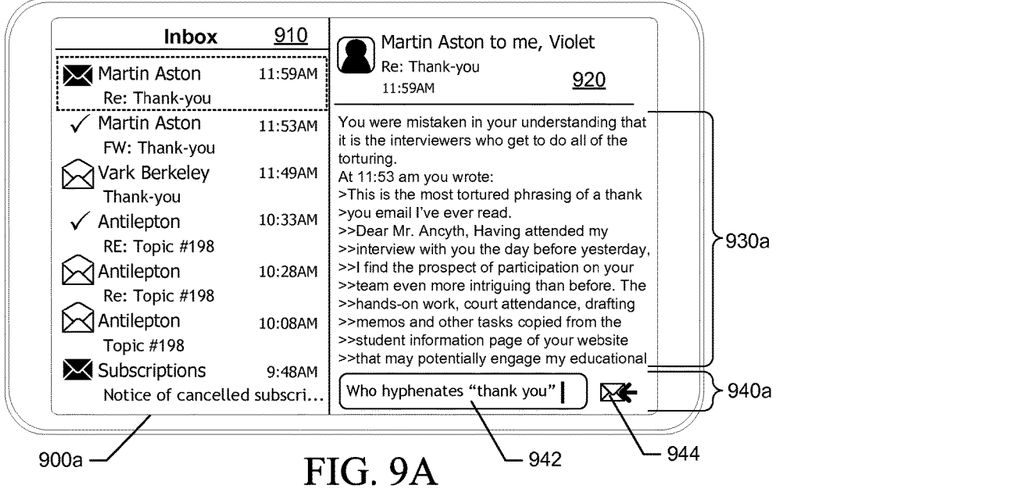
FIGS. 9A and 9B are diagrams illustrating example user interface screens for use with a unified inbox application.

FIGS. 9A and 9B illustrate still a further messaging example, here in relation to a unified inbox or similar application. In FIG. 9A, initial screen 900a includes a message listing pane 910 and a message preview pane 920. The "history" region 930a of the screen 900a here contains context as in the earlier examples, although in this case the context is a previously sent or received message. The screen 900a includes a user action interface region 940a, which contains both an input field of fixed width and height 942, and at least one user interface element for invoking an action 944, in this case a "reply" button. Text or graphic content may be input in the input field 942, as shown in FIG. 9A.

Figure 9B:
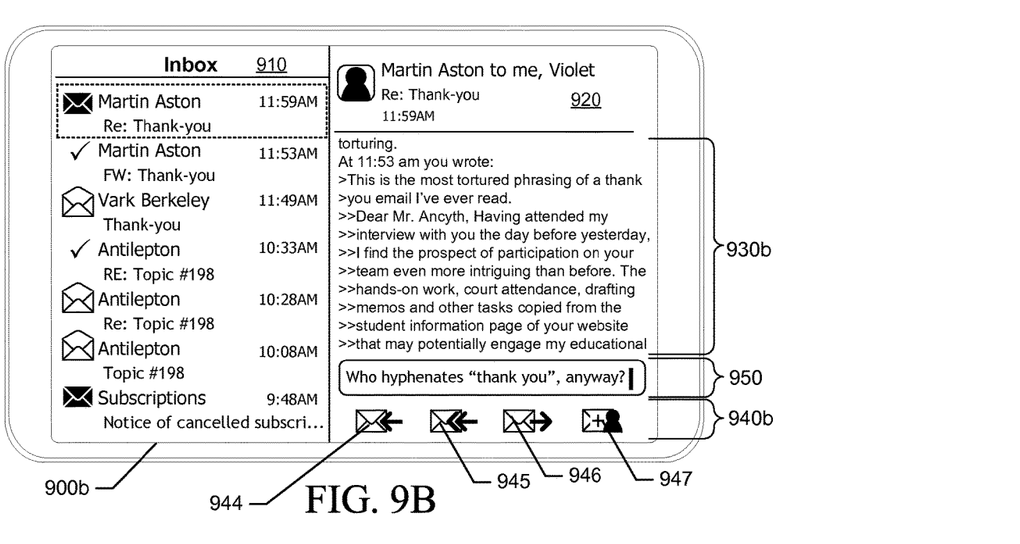

In response to a detected overflow condition, the mobile device 100 transitions to a further screen 900b in which the history region 930b is reduced to accommodate a new, wider input field 950 which now contains the overflowing content, and a modified action region 940b that includes user interface elements for invoking various actions associated with input message content, such as sending the message as a reply 944; sending the message as a reply-all 945; sending the message as forward 946; and adding a recipient 947. Again, the user action input region 940a in FIG. 9A transitions from a multimodal input region to a single-mode input region 940b, while a separate content input field 950 is provided.

Figure 10A:
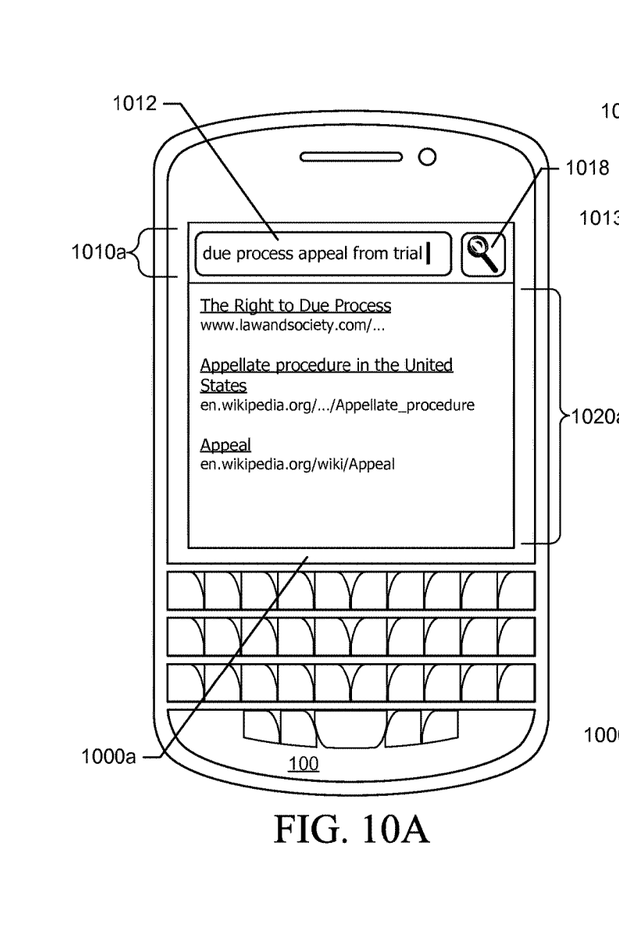
FIGS. 10A and 10B are diagrams illustrating example user interface screens for use with a web browser application.
Figure 10B:
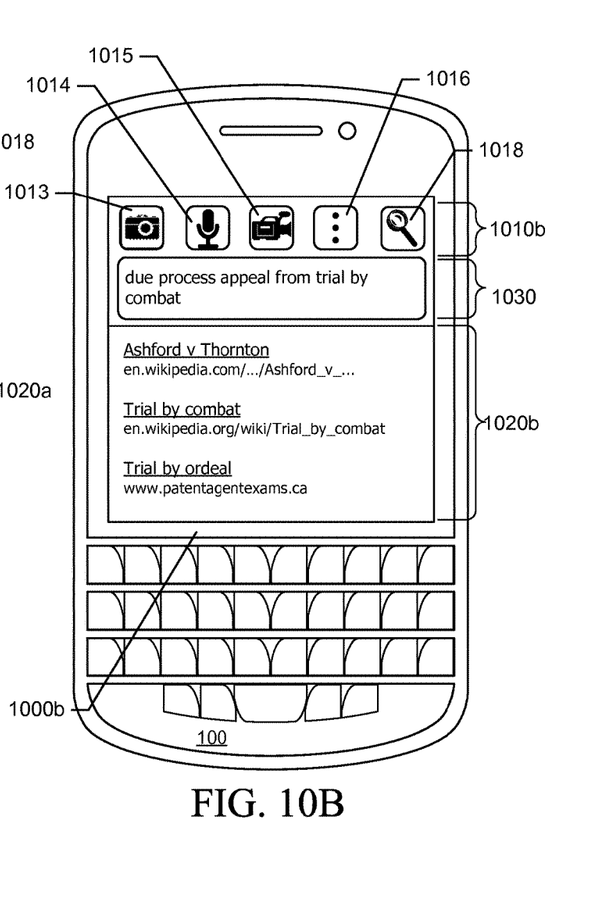

FIGS. 10A and 10B illustrate still a further example of the user interface scheme described above, this time for use with a browser application, which is an application other than a messaging application that requires textual user input. As can be seen in FIG. 10A, a first screen 1000a includes a history region 1020a, which here may contain search results from an earlier search query or some other result; and a user input field 1012 and user interface element for initiating a search or query action 1018 in a user action interface region 1010a. In response to overflow text being detected in the input field 1012, the user interface screen may transition to 1000b in FIG. 10B, in which the history region 1020b has decreased in size to accommodate a new input field 1030, which itself is translated and expanded from the original input field 1012. There is also now provided a separate modified user action interface region 1010b, which includes various user interface elements 1013, 1014, 1015, and 1016 in addition to 1018 to invoke other functions related to the input content. In this case, these functions may pertain to a search.

Figure 11:
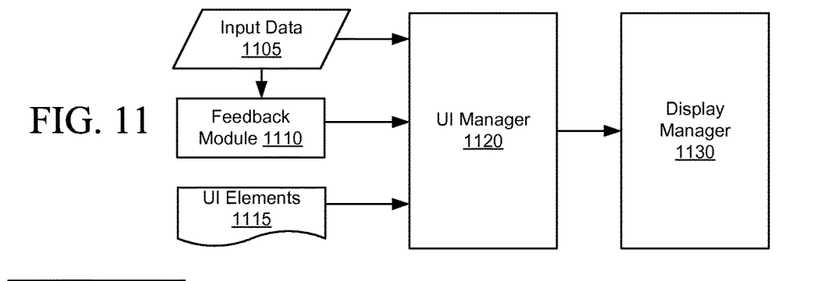
FIG. 11 is a schematic illustrating handling of input data and feedback in accordance with embodiments described herein.

The foregoing examples are not intended to be limiting, but merely to provide examples of implementation of the solution provided herein. It will be appreciated that the implementation of the transitioning user interface screens, detection of overflow, and so on, may be implemented using any suitable means and components of a mobile device 100. FIG. 11 illustrates a high-level schematic of select components of a mobile device 100 for implementing the foregoing examples. Input data 1105, in the form of received input from a user who is indirectly (or directly) inputting content in a content input field is input to a user interface manager 1120 that processes content and delivers screens or individual user interface elements to a display manager 1130, which in turn outputs the content, screens, and elements to an internal or external display (not shown in FIG. 11). The user interface manager 1120 also receives data from a feedback module that determines a character count, or any other input-content related data, for output via the display manager. This information, together with the input data 1105 and any "chrome" or user interface graphic elements stored in memory 1115, are received and integrated by the user interface manager 1120 to generate the output for the display manager 1130. The various screens and user interface graphic elements and overflow handling methods that are described above may be built, for example, using any suitable user interface-building toolkit and development platform available for the operating system environment provided on the mobile device 100.

Figure 12:
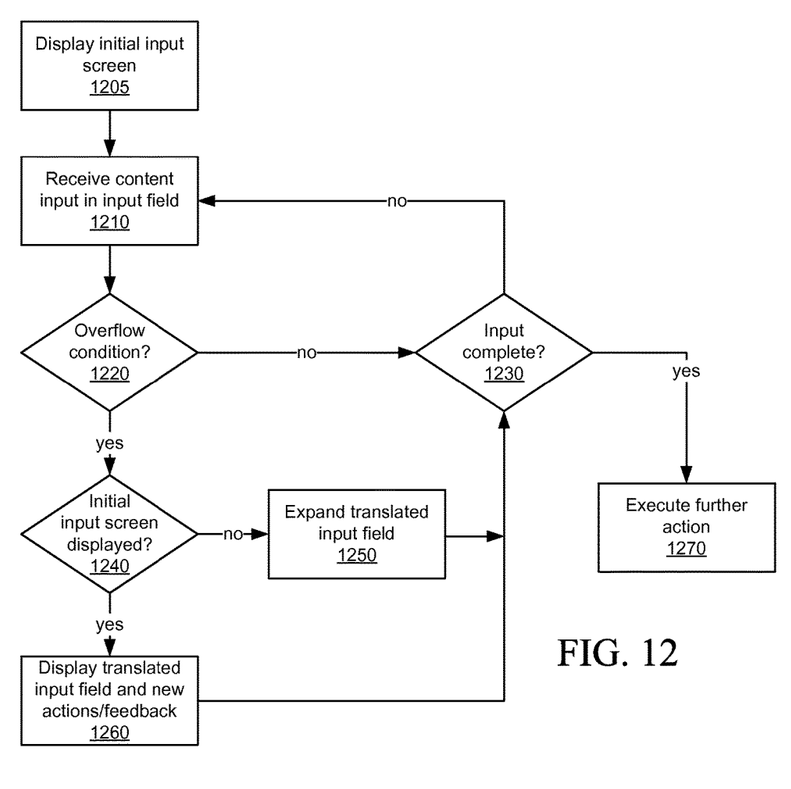
FIG. 12 is a flowchart illustrating a method for handling overflow conditions at a mobile device.

FIG. 12 sets out an overview method for a device for handling overflow input as generally described above. At 1205, an initial input screen is displayed. At 1210, input content is received in the input field, as described above. At 1220, it is determined whether there is an overflow condition. If not, a determination is made at 1230 whether input is complete. If input is not complete, input continues to be received until it is determined that the input is complete, at which point any further actions requested by the user (e.g., to send the content) are executed at 1270.

If an overflow condition is detected at 1220, then if the initial input screen is currently displayed as determined at 1240, the input screen is transitioned at 1260 to a modified input screen as generally described above, with a content input field translated and expanded to a new position that may not be overlapping with a previous position, and further with an enhanced user action interface region with additional controls or feedback elements. The content input to date is presented in the new input field. A determination is again made whether the input is complete at 1230; if it is not, and further input results in another overflow condition at 1220, it is again determined whether the initial screen is being displayed at 1240; in this case, it is no longer being displayed, so in response the device expands only the translated input field to accommodate the additional content. The process repeats until input is complete.

It should be recognized by those skilled in the art that the foregoing examples, while described and illustrated with respect to a handheld mobile device such as a smartphone, may be implemented on devices with larger screen sizes. It should also be recognized that although this is illustrated in the context of a full-screen application, the same concepts can be modified for use in an environment where the application user interface is displayed only in a window (i.e., not occupying an entire screen).

It should be understood that steps and the order of the steps in the processing described herein may be altered, modified and/or augmented and still achieve the desired outcome. Moreover, all of the various examples and modifications described throughout this specification can be combined and should not be considered to be discrete embodiments. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method for receiving and presenting input content on a communication device, the method comprising:
   initially displaying an input screen on a display of the communication device, the input screen including a user action interface region comprising a first input field having a first fixed width and a fixed height;
   receiving content in the first input field;
   detecting an overflow condition for the first input field, wherein the overflow condition is detected when a displayable width of the received content exceeds the first fixed width of the first input field; and
   when the overflow condition is detected,
      replacing the first input field with either at least one user interface element invocable to initiate an action pertaining to the received content, or a feedback user interface element comprising information relating to the received content;
      displaying, in a region of the input screen adjacent to the user action interface region, a second input field having a second width greater than the first fixed width, and wherein the first input field having the first fixed width and the fixed height is removed from the input screen; and
      presenting the received content in the second input field.

2. The method of claim 1, further comprising:
   receiving additional content in the second input field; and
   when a further overflow condition is detected for the second input field, expanding an area of the second input field including expanding a height of the second input field and continuing to receive additional content, wherein the height of the second input field is in a direction of increasing line order.

3. The method of claim 1, wherein the initially displayed input screen includes a history region positioned adjacent the user action interface region, and further wherein displaying the second input field comprises inserting the second input field between the history region and the user action interface region.

4. The method of claim 1, wherein the user action interface region has a defined width, and the second width of the second input field is substantially equal to the defined width of the user action interface region.

5. The method of claim 1, wherein content is received in the first input field and the second input field by an indirect user input method, and the at least one user interface element is invocable by a direct user input method.

6. The method of claim 1, wherein the display is a touchscreen display; the indirect user input method comprises either text input using a virtual keyboard or physical keyboard, or text input using speech to text recognition; and the direct user input method comprises a touch on the at least one user interface element.

7. The method of claim 1, wherein the initially displayed user action interface region further comprises at least one initial user interface element invocable to initiate an action pertaining to the received content, the at least one initial user interface element being invocable by a direct user input method.

8. The method of claim 1, wherein the input screen is either a messaging input screen or a browser input screen.

9. A method for receiving and presenting input content on a communication device, the method comprising:
   displaying an input screen on a display of the communication device, the input screen including a first input field for receiving user-input content, the first input field having a first fixed width and a fixed height and occupying a first region of the input screen;
   receiving user-input content in the first input field;

detecting an overflow condition for the first input field, wherein the overflow condition is detected when a displayable width of the received user-input content exceeds the first fixed width of the first input field; and when the overflow condition is detected,
executing a translation and expansion of the first input field to provide a second input field displayed in the input screen in place of the first input field, the second input field occupying a second region of the touchscreen that does not overlap with the first region, the second input field having a second fixed width greater than the first fixed width of the first input field, and wherein the first input field occupying the first region is removed from the input screen, and presenting the received user-input content in the second input field.

10. A communication device adapted for receiving and presenting input content, the communication device comprising:
a display; and
a processor in communication with the display, the processor being configured to:
initially display an input screen on the display, the input screen including a user action interface region comprising a first input field having a first fixed width and a fixed height;
receive content in the first input field;
detect an overflow condition for the first input field, wherein the overflow condition is detected when a displayable width of the received content exceeds the first fixed width of the first input field; and
when the overflow condition is detected,
replace the first input field with either at least one user interface element invocable to initiate an action pertaining to the received content, or a feedback user interface element comprising information relating to the received content;
display, in a region of the input screen adjacent to the user action interface region, a second input field having a second width greater than the first fixed width, and wherein the first input field having the first fixed width and the fixed height is removed from the input screen; and
present the received content in the second input field.

11. The communication device of claim 10, wherein the user action interface region has a defined width, and the second width of the second input field is substantially equal to the defined width of the user action interface region.

12. The communication device of claim 10, wherein content is received in the first input field and the second input field by an indirect user input method, and the at least one user interface element is invocable by a direct user input method.

13. A non-transitory computer-readable medium bearing code which, when executed by at least one processor of a communication device, causes the device to implement the method of:
initially displaying an input screen on a display of the communication device, the input screen including a user action interface region comprising a first input field having a first fixed width and a fixed height;
receiving content in the first input field;
detecting an overflow condition for the first input field, wherein the overflow condition is detected when a displayable width of the received content exceeds the first fixed width of the first input field; and when the overflow condition is detected,
replacing the first input field with either at least one user interface element invocable to initiate an action pertaining to the received content, or a feedback user interface element comprising information relating to the received content;
displaying, in a region of the input screen adjacent to the user action interface region, a second input field having a second width greater than the first fixed width, and wherein the first input field having the first fixed width and the fixed height is removed from the input screen; and
presenting the received content in the second input field.

14. The non-transitory computer-readable medium of claim 13, the method implemented by the at least one processor further comprising:
receiving additional content in the second input field; and
when a further overflow condition is detected for the second input field, expanding an area of the second input field including expanding the height of the second input field and continuing to receive additional content, wherein the height of the second input field is in a direction of increasing line order.

15. The non-transitory computer-readable medium of claim 13, wherein the initially displayed input screen includes a history region positioned adjacent the user action interface region, and further wherein displaying the second input field comprises inserting the second input field between the history region and the user action interface region.

16. The non-transitory computer-readable medium of claim 13, wherein the user action interface region has a defined width, and the second width of the second input field is substantially equal to the defined width of the user action interface region.

17. The non-transitory computer-readable medium of claim 13, wherein content is received in the first input field and the second input field by an indirect user input method, and the at least one user interface element is invocable by a direct user input method.

18. The non-transitory computer-readable medium of claim 13, wherein the display is a touchscreen display; the indirect user input method comprises either text input using a virtual keyboard or physical keyboard, or text input using speech to text recognition; and the direct user input method comprises a touch on the at least one user interface element.

19. The non-transitory computer-readable medium of claim 13, wherein the initially displayed user action interface region further comprises at least one initial user interface element invocable to initiate an action pertaining to the received content, the at least one initial user interface element being invocable by a direct user input method.

20. The non-transitory computer-readable medium of claim 13, wherein the input screen is either a messaging input screen or a browser input screen.

* * * * *